May 9, 1950   L. A. WILLIAMS, JR   2,507,130
FUEL CONTROL APPARATUS
Filed Feb. 28, 1947   2 Sheets-Sheet 1

Inventor:
Lynn A. Williams, Jr.,
By Hinkle, Horton, Ahlberg, Hansmann & Wupper
Attorneys.

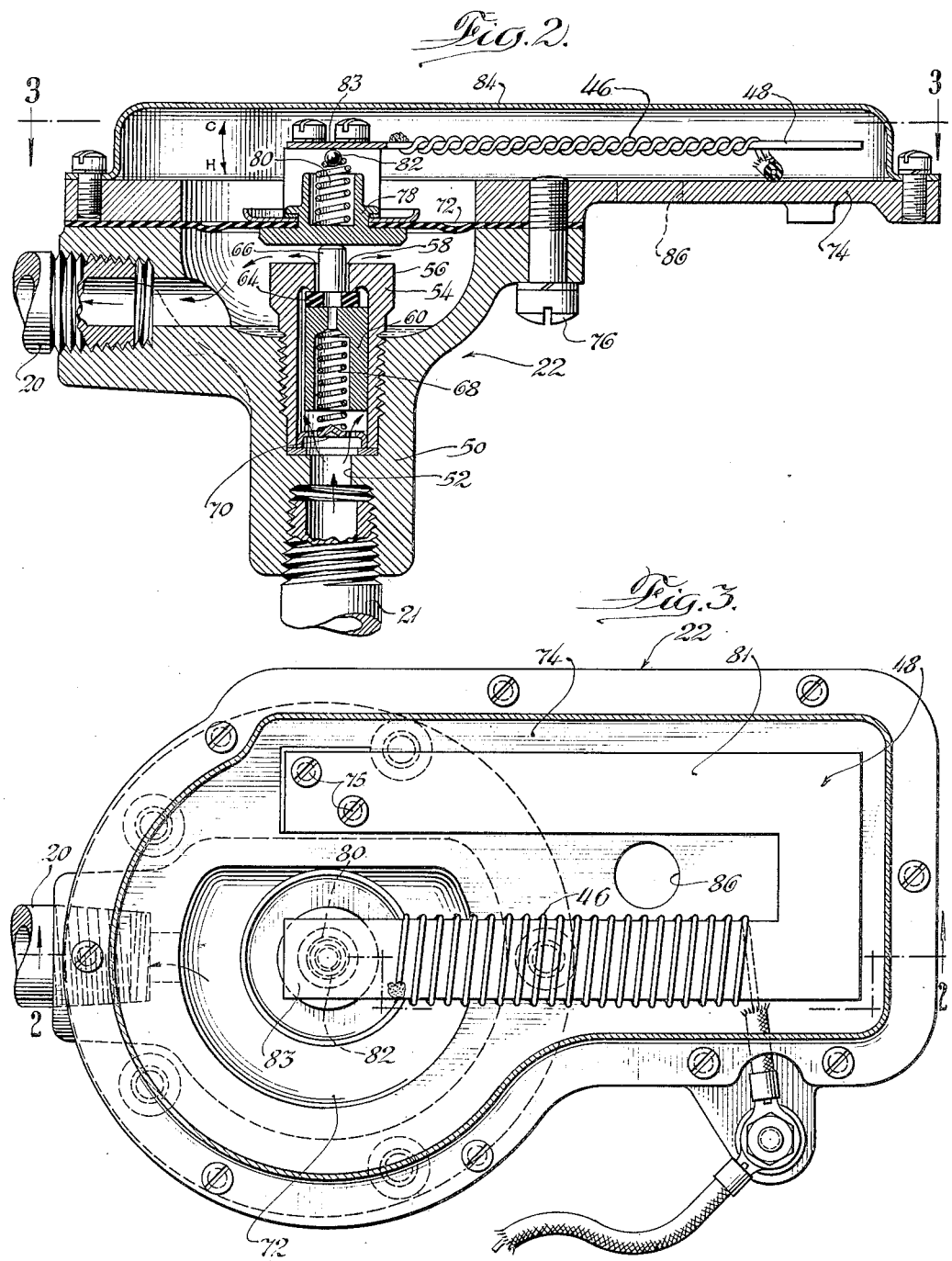

Patented May 9, 1950

2,507,130

UNITED STATES PATENT OFFICE 2,507,130

FUEL CONTROL APPARATUS

Lynn A. Williams, Jr., Indianapolis, Ind., assignor to Stewart-Warner Corporation, Chicago, Ill., a corporation of Virginia Application February 28, 1947, Serial No. 731,474

1 Claim. (Cl. 236—68)

My invention relates generally to fuel control apparatus, particularly apparatus for controlling the flow of fluid fuel to a heater.

Certain aspects of the present invention have a more general application and may be considered as relating to a remotely controlled automatic pressure regulator. The present application is a continuation in part of my copending application Serial No. 591,543 filed May 2, 1945, for "Fuel control apparatus," now Patent No. 2,483,747, dated October 4, 1949.

For the purpose of better understanding of the invention it will be described as applied to a gasoline burning automobile heater although, as pointed out above, the invention has other utility.

In fluid fuel burning heaters as used for example for heating the passenger compartments of automobiles, the fuel is supplied from the engine operated fuel pump of the automobile, and the pressure at which the fuel is supplied to the heater may therefore vary throughout a substantial range, depending upon the speed of operation of the engine. In heaters of this type, it is common practice to utilize an electric igniter of the hot wire type. A short interval of time is required to heat it to a temperature at which it will ignite the fuel, and if the fuel is supplied to the heater during this time interval, some of the fuel may pass through the heater without being burned, or it may collect in various parts of the heater. Furthermore, the presence of the fuel in the heater while the igniter is being heated to its ignition temperature, slows down the heating of the igniter because some of the heat generated thereby is lost in vaporizing the fuel prior to the time that the igniter is hot enough to ignite the vapor.

It is therefore one of the objects of the invention to provide an improved fuel control valve for heaters, in which the opening of the fuel supply valve is delayed until the igniter has been heated to a temperature at which it can ignite the fuel.

A further object of the invention is to provide an improved electrically controlled fuel valve.

A further object is to provide a fuel line valve which operates to regulate the pressure at which the fuel is supplied, and also is electrically operated to permit and stop the flow of fuel.

Other objects will appear from the following description, reference being had to the accompanying drawings, in which:

Fig. 2 is a central vertical sectional view of the improved control valve, taken on the line 2—2 of Fig. 3; and Fig. 3 is a sectional view taken on the line 3—3 of Fig. 2.

Figure 1:
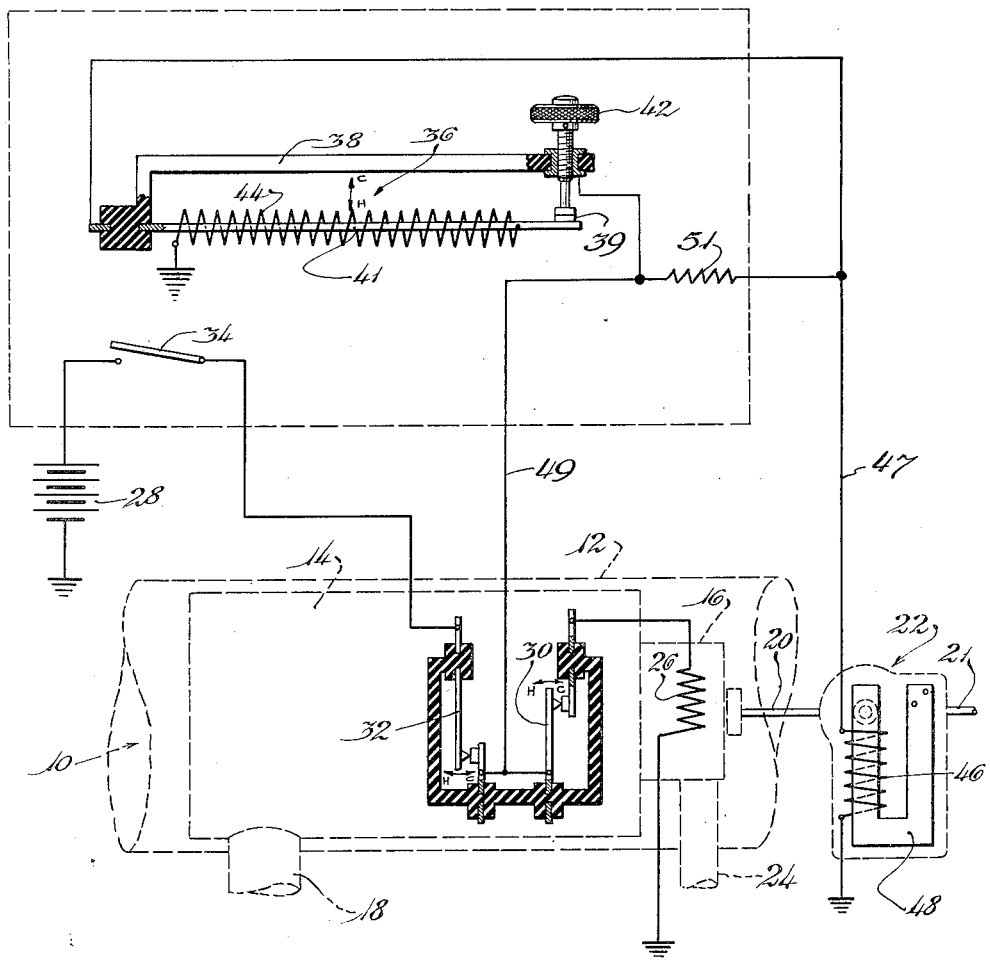
Fig. 1 is a schematic wiring diagram of the control circuits and diagrammatically illustrates the control elements, parts of the heater being shown in phantom.

Referring to Fig. 1, a heater 10 is illustrated in phantom as comprising a casing 12 in which is located a heat exchanger 14 and a combustion chamber 16, from which the products of combustion flow through the heat exchanger and are discharged through an exhaust conduit 18. Fuel is supplied to the combustion chamber 16 through a pipe 20 from a suitable source, such as the fuel pump of an automobile. The flow of fuel through the pipe 20 is controlled by a fuel valve 22, while air for combustion is supplied to the combustion chamber through a conduit 24.

An electrical igniter 26 of the hot wire type is suitably located to ignite the fuel mixture in the combustion chamber, and has one of its terminals grounded. The other terminal is adapted to be connected to a source of electrical energy such as the automobile battery 28, through a thermostatic igniter de-energizing switch 30, a thermostatic overheat switch 32, and a manually operable heater control main switch 34.

Located in the passenger compartment of the automobile or other space to be heated by the heater is a control switch 36 comprising an insulating support 38 for a thermostatic bimetal switch arm 41, the free end of which carries one of a set of contacts 39. The other contact in the set is secured to the end of an adjustment screw 42 also supported by the insulating support 38. Thus, by rotating the adjustment screw 42 the point at which the contacts 39 engage may be adjusted.

The switch arm 41 has a heating coil 44 wound thereon but insulated therefrom. A heating coil 46 is similarly wound about one leg of a U-shaped bimetallic thermostatic actuator 48 forming part of the fuel valve 22. One terminal of the heating coil 46 is grounded while the other terminal is connected by a wire 47 to the switch arm 41 and by way of this arm to one of the contacts of the set 39. The heating coil 44 has one of the terminals connected to the blade or arm 41 while the other terminal is grounded. The circuit to the battery 28 is completed by way of a wire 49 which leads from the adjustment screw 42 to the connection between the overheat switch and the igniter switch. Current is therefore supplied from the battery 28 through the master switch 34 and overheat switch 32 and wire 49 to the adjustable contact carried by the screw 42. For a purpose to be pointed out presently, a resistor 51 is connected between leads 47 and 49 so as to be across the contacts 39.

Assuming the heater to be cold and the overheat switch 32 and igniter de-energizing switch 30 closed, and assuming further that the switch arm 40 is in the position shown and the switch 36 thus closed, closure of the main switch 34 will result in supplying current to the igniter 26 and also to the two heating coils 44 and 46. In other words, the heating coil 44 is energized through the contacts 39 while the heating coil 46 is energized by way of these same contacts, the resistance in this direction being considerably lower than by way of the resistor 51 with the result that very little current flows through the latter resistor. As the temperature of the bimetal blade 41 rises it will deflect downwardly and separate the contacts 39, thereby de-energizing the circuit through the heater coil 44 and reducing the current flow through the heater 46, the latter heater being supplied only by way of the relatively high resistance 51. Subsequently the blade 41 will cool sufficiently to reengage the contacts 39, thereby repeating the cycle.

The fuel valve 22 is preferably of the construction illustrated in Figs. 2 and 3, and comprises a body 50 having the fuel supply pipe 21 connected thereto to supply fuel through an inlet port 52. A valve seat member 54 is threaded in the body 50 and is provided with a valve seat 56 and a port 58. Within the valve seat member 54 there is a cylindrical bore providing a guide for a valve stem 60, which is of noncircular cross section to provide a passageway 62 for the flow of fuel. A valve disc 64 is secured to the valve stem 60 by a shouldered pin 66 pressed into the stem. The stem 60 is recessed to receive a helical coil spring 68 which rests upon an apertured centering seat 70 and normally holds the valve disc 64 in engagement with its seat 56.

A flexible diaphragm 72 has its edge clamped between the body 22 and a plate 74 by a plurality of cap screws 76. The diaphragm 72 has a central opening which is closed by a member 78, the latter being suitably clamped to the diaphragm in a fuel-tight manner. The member 78 has a bore for the reception of a compression coil spring 80, the upper turn of which is of reduced diameter and has a ball bearing 82 silver soldered or brazed thereto. The U-shaped bimetal 48 is symmetrical and has one end of one leg 81 thereof fastened to the plate 74 by screws 75. The other leg 83 of this U-shaped bimetal which has the electrical heating winding 46 thereon, has its end located directly above the ball 82 so as normally to be in contact therewith. The leg 81 flexes in response to ambient temperature and thus acts as an ambient temperature compensator for the leg 83. The U-shaped bimetal is protected by a thin sheet metal cover 84 and the space enclosed by this cover has free access to the atmosphere through a hole 86 formed in the plate 74. The flow through the pipe 20 will be restricted by a small orifice in a well known manner.

In operation, the main switch 34 is closed by the operator of the vehicle, thus supplying current through the normally closed overheat switch 38, the heater winding 44, switch 36, and heater winding 46. In addition, current will be supplied to the igniter 26 through the igniter de-energizing switch 30 and to the heater 46 by way of the bridging resistor 51.

As the leg 83 of the U-shaped bimetal 48 is heated, its free end presses downwardly upon the diaphragm through the spring 80, and after it has been heated for a length of time sufficient for the igniter 26 to have attained ignition temperature, will exert a sufficient force in a downward direction upon the pin 66 to move the valve disc 64 from its seat 56. Fuel may therefore flow past the valve into the chamber beneath the diaphragm 72, exerting pressure thereon opposing that applied by the leg 83. At the same time, the bimetal switch arm 41 will be heated and will commence flexing downwardly so that the contacts 39 will soon be separated, thereby de-energizing heater 44 and reducing the current flow through heater 46. The contacts 39 subsequently reclose after a short time interval.

As soon as the fuel commences flowing to the heater past the valve 64, it will be ignited by the igniter and ventilating air flowing through the casing 12 will commence delivering heat to the space to be heated. As the combustion heater approaches its normal operating temperature, the igniter de-energizing switch 30 will open, thereby turning off the igniter.

Because of the heat capacity of the bimetal blade 48 there will be an appreciable time interval after current starts flowing through the heating element 46 before the bimetal blade 48 will respond sufficiently to open the valve 22. During this time interval the igniter 26 is raised substantially to ignition temperature so that by the time the fuel reaches the heater in any substantial quantity the igniter will be hot.

The bridging resistor 51 is provided so that if the circuit to the heater system is closed at the switch 34 sufficient current will always flow through the heating element 46 to insure operation of the heater at the minimum level. In other words, if the temperature within the space to be heated is high enough so that the contacts 39 remain disengaged the heater nevertheless will receive sufficient fuel to operate. This prevents the possibility of fuel being supplied at a rate too low to maintain combustion.

As the pressure of the fuel within the chamber beneath the diaphragm builds up, the pressure which is exerted on the diaphragm 72 by the fuel will tend to cause the valve 64 to move toward closed position, such movement being permitted but resisted by the spring 80 and the resiliency of the U-shaped bimetal 48.

Due to the time constant of the cycle imposed by the time required to heat and cool the bimetal switch arm 41, fuel will be continuously supplied to the heater, but the average rate at which it flows will depend upon the relative length of time that the switch 36 is closed and opened. This is caused by the fact that when the switch is closed for a longer interval, the leg 81 will be heated to a higher temperature and therefore will deflect downwardly to a greater extent and cause the fuel in the chamber below the diaphragm 72 to attain a higher pressure, and thus an increased flow rate. The length of the portion of the cycle during which the switch 36 is closed is, of course, determined by the temperature of the air in the space being heated and the setting of the adjustment screw 42.

The remotely controlled pressure regulator valve is quite smooth in its operation. In other words, the pressure on the downstream side of the valve will remain substantially constant over a period of time without substantial fluctuations because the impulse sending unit has a comparatively short cycle of operation while the receiving unit has a heating element 44 and blade 48 with a considerably longer period of operation. As an example, if the sending unit sends impulses at the rate of one every three or four seconds or so and the rate of response of the receiving unit is such that these impulses are integrated smoothly so as to cause the receiving bimetal blade to have a smooth downward or upward trend until a balanced condition is reached it will be appreciated that the abrupt on and off cycles of the sending unit will have little instantaneous effect on the receiving unit. The effect, therefore, is that an increased demand for heat will result in greater power dissipation in the heater coil 44 over a period of time, thereby causing the bimetal blade 48 gradually to apply a higher and higher pressure to the end of the valve stem 66. The result is that a higher and higher fuel pressure will be required in the space beneath the diaphragm 72 to balance the pressure conditions set up by the bimetal actuating blade 48.

Whenever the heater switch 34 is opened the system will be de-energized with the result that the heating element 46 and bimetal blade 48 will cool. Pressure is therefore relieved upon the valve stem 66 and the valve is closed by the spring 68, thereby turning off the supply of fuel to the heater until such time as the switch 34 is reclosed.

As is customary in heaters of this type, the igniter de-energizing switch 30 recloses upon sufficient cooling of the heater, due to failure of combustion, while the overheat switch 32 will be opened whenever the normal operating temperature of the heater is materially exceeded.

It will thus be clear from the foregoing that the control system operates in an efficient and reliable manner to control the pressure at which fuel is supplied to the heater, and that this control means is not only responsive to the temperature of the space being heated, but also has provisions to prevent opening of the fuel supply valve until a certain time sufficient for the igniter to attain ignition temperature has elapsed.

While I have shown and described a preferred embodiment of my invention, it will be apparent that numerous variations and modifications thereof may be made without departing from the underlying principles of the invention. I therefore desire, by the following claim, to include within the scope of the invention all such variations and modifications by which substantially the results of my invention may be obtained through the use of substantially the same or equivalent means.

I claim:

A fuel shutoff and modulating control valve for combustion heaters of the type which include an electric igniter of incandescent type which is slow to heat to ignition temperatures when energized, said valve comprising a valve body having a valve seat therein and having a chamber, inlet and outlet passages in said body connected to said chamber, said inlet passage including said valve seat, a valve co-operable with said seat, a diaphragm forming one wall of the chamber and connected to apply a valve closing force to said valve which is a function of the pressure in said chamber, resilient means urging said valve against said seat, a thermostatic element, a resilient operating connection between said thermostatic element and said valve, an electric heater to heat said thermostatic element to cause the latter to apply a force through said resilient operating connection in a direction to open said valve, said force being a function of the electric energy dissipated in said electric heater, the characteristics of said thermostatic element, said electrical heating means and said resilient means being such that simultaneous energization of said heating means and said igniter will result in said igniter heating to ignition temperature before the force applied by said thermostatic element is sufficient to open said valve, circuit means including a source of electric energy for application of an electric potential to said electric heater to vary the force imposed upon said valve by said thermostatic element, and a thermostatic circuit interrupter in said circuit to determine the proportion of the time said potential is applied to said electric heater in accordance with the temperature of said thermostatic circuit interrupter, said thermostatic circuit interrupter being sensitive to the temperature of the space to be heated by said combustion heater.

LYNN A. WILLIAMS, Jr.

REFERENCES CITED

The following references are of record in the file of this patent:

UNITED STATES PATENTS

| Number | Name | Date |
| --- | --- | --- |
| 1,974,884 | Spencer | Feb. 20, 1934 |
| 1,994,771 | Knopp | Mar. 19, 1935 |
| 2,143,277 | McCorkle | Jan. 10, 1939 |
| 2,229,402 | Anderson | Jan. 21, 1941 |